United States Patent
Vortkort et al.

(10) Patent No.: US 6,774,162 B1
(45) Date of Patent: Aug. 10, 2004

(54) THERMOPLASTIC VULCANIZATE AND ITS METHOD OF PRODUCTION

(75) Inventors: Jörg Vortkort, Toppenstedt (DE); Friedrich Wilhelm Gräbner, Stelle (DE); Andre Bontemps, Hamburg (DE); Stefan Volkmann, Eschede (DE)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 09/913,613

(22) PCT Filed: Feb. 3, 2000

(86) PCT No.: PCT/DE00/00329

§ 371 (c)(1),
(2), (4) Date: Aug. 15, 2001

(87) PCT Pub. No.: WO00/49086

PCT Pub. Date: Aug. 24, 2000

(30) Foreign Application Priority Data

Feb. 15, 1999 (DE) .......................... 199 06 002

(51) Int. Cl.⁷ ................................. C08K 5/00
(52) U.S. Cl. .................. 524/80; 524/323; 524/515; 525/59; 525/88; 525/89; 525/191; 525/194; 525/197; 525/240; 525/333.3; 526/351; 526/352; 526/352.2; 526/348.6
(58) Field of Search .................. 524/80, 323, 515; 525/59, 88, 89, 191, 194, 197, 240, 333.3; 526/351, 352, 348.6, 352.2

(56) References Cited

U.S. PATENT DOCUMENTS

| | | |
|---|---|---|
| 3,806,558 A | 4/1974 | Fischer |
| 4,130,535 A | 12/1978 | Coran et al. |
| 4,311,628 A | 1/1982 | Abdou-Sabet et al. |
| 5,384,366 A | 1/1995 | Paganelli |
| 5,843,577 A * | 12/1998 | Ouhadi et al. ........... 428/474.7 |

FOREIGN PATENT DOCUMENTS

| | | |
|---|---|---|
| DE | 26 32 654 | 2/1977 |
| EP | 0 092 318 | 10/1983 |
| EP | 0 107 635 | 5/1984 |
| EP | 0 216 193 | 4/1987 |
| EP | 0 735 091 | 10/1996 |
| EP | 0 757 077 | 2/1997 |
| EP | 0 850 991 | 7/1998 |
| GB | 2 007 683 | 11/1977 |
| WO | WO 97/39059 | 10/1997 |
| WO | WO 98/58020 | 12/1998 |

* cited by examiner

*Primary Examiner*—William Cheung
(74) *Attorney, Agent, or Firm*—Collard & Roe, P.C.; John H. Hornickel

(57) ABSTRACT

The invention relates to a thermoplastic vulcanizate comprising four components (A, B. C, D), notably: a thermoplastic (A); a substantially non-cross-linked polyethylene (B); an at least partially vulcanized rubber (C); a softener (D); as well as standard blend ingredients (E). The above mixture contains between 5 and 20% by weight thermoplastic (A), in relation to the sum of the four components (A, B, C, D). The invention also relates to advantageous material parameters and process steps.

17 Claims, No Drawings

THERMOPLASTIC VULCANIZATE AND ITS METHOD OF PRODUCTION

CROSS REFERENCE TO RELATED APPLICATIONS

Applicants claim priority under 35 U.S.C. §119 of German Application No. 199 06 002.9, filed on Feb. 15, 1999. Applicants also claim priority under 35 U.S.C. 365 of PCT/DE00/00329, filed on Feb. 3, 2000. The international application under PCT article 21(2) was not published in English.

DESCRIPTION

The invention relates to a thermoplastic vulcanizate.

Thermoplastic vulcanizates are blends that are comprised of a thermoplastic and a cross-linked elastomer. The process of cross-linking of the elastomer is carried out by dynamic vulcanization. The term "dynamic vulcanization" is understood to relate to a process in which the thermoplastic material, the rubber and the cross-linking system are masticated while the rubber is being cross-linked. Examples of dynamic vulcanization are described in the patents U.S. Pat. No. 4,130,535 and U.S. Pat. No. 4,311,628. Laid-open patent specification DE-A 26 32 654 describes a blend that is comprised of a thermoplastic polyolefin, an EPDM rubber and any one of the cross-linking systems known from U.S. Pat. No. 3,806,558. The rubber is vulcanized to such a degree that that it no longer contains more than about three percent of rubber that can be extracted in cyclohexane at 23° C. GB-A 2 007 683 describes a thermoplastic elastomer containing a thermoplastic, crystalline polyolefin resin and vulcanized EPDM. The rubber is cross-linked in a phenolic resin. The degree of cross-linking so achieved is higher than 97%. Furthermore, WO-A 98/58020 describes a TPE blend based on a thermoplastic olefin, an EPDM rubber and an ethylene-octene copolymer (EOC). The thermoplastic vulcanizates introduced in said published patent document are produced without plasticizing oils. Moreover, a novel type of cross-linking system is employed. The cross-linking system is comprised of a phenolic resin and an oxide based on Mg, Pb, or Zn. Said system leads in said process to partial cross-linking of the EOC. The drawback with the described TPE is a high degree of swelling of the oil, such swelling being conditioned by the formula. Furthermore, the flowability is deteriorated due to partial cross-linking of the EOC. Moreover, increased raw material costs have to be expected on account of the high polymer content.

It is pointed out in EP-B-0 107 635 that the mixing methods employed until that time for producing the dynamically vulcanized thermoplastic elastomers are not suitable for producing mixtures with good extrusion properties. Described is a single-stage process in which a twin-screw extruder with screws revolving in the same sense of rotation is employed, which, at high shearing rates of >2000 s−1 and a dwelling time of <2 minutes permits the production of soft thermoplastic elastomers with good extrusion properties.

The development and production of soft thermoplastic vulcanizates that can be produced at favorable cost is particularly important for the further advance of TPE materials in the field of application of the classical elastomers. Soft thermoplastic vulcanizate are understood in the following to be materials with a hardness of less than 70 Shore A (said value relates to measurements on extruded flat sections). Since the absorption of oil of the rubber phase is limited, minimum hardness values of about 50 Shore A can be obtained in connection with thermoplastic vulcanizates based on EPDM/PP by adding plasticizer oils (EP-A 0 757 077). Even in said hardness a range, the increasing amount of the oil component already leads to a decrease in the mechanical properties as well as to increased fogging values. Also, it may be possible that the oil sweats out on the surface of the molded component. The values specified herein in the following are given only by way of example. Based on 100 parts rubber, a thermoplastic vulcanizate with a hardness of 50 Shore A contains about 150 to 200 parts of oil. In order to keep the technical processing expenditure within economically justifiable limits when the plasticizer oil is mixed in, EPDM rubbers extended with oil are preferably used. Again, however, a drawback is also in this connection the fact that the EPDM-types of rubber extended with oil are expensive in comparison to the non-diluted types of EPDM. Furthermore, types of EPDM extended with oil are available in the market, which are extended with 75 or 100 parts and contain plasticizer oils that comprise aromatics, so that discoloration occurs during in the course of wheathering. Therefore, the production of bright and soft thermoplastic vulcanizates poses special problems. With the dynamic vulcanizates available in the market on the basis of EPDM/PP, discoloration can be restricted only by means of suitably high expenditure on the raw material side, but is not entirely avoidable.

The addition of styrene block copolymers, which leads to a reduction in the hardness as well, is expensive and, furthermore, reduces the weather stability.

The patent literature cited in the following introduces formulas and process variations that permit the production of thermoplastic vulcanizates. A very soft thermoplastic vulcanizate (<60 Shore A, preferably <45 Shore A) is described in EP-A 0 757 077. Said vulcanizate consists of two vulcanized rubbers EPDM and BR, or SBR or CR, and a larger amount of process oil. The vulvanized rubbers are present in the thermoplastic matrix in the form of a finely distributed dispersed phase. A soft thermoplastic vulcanizate with a partially cross-linked rubber phase is introduced in WO-A 97/39059, which preferably consists of a thermoplastic polyethylene (homo- or copolymer), an amorphous polypropylene, and an EPDM- or BR-rubber. The amorphous polypropylene is. preferably added only after the rubber has been dynamically vulcanized.

Finally, it is pointed to EP A 0 092 318 which shows a thermoplastic blend of polyolefin and an elastomeric softener. The main objective is to be able to produce polypropylene foils of high value on polyethylene-working machines.

Now, as the thermoplastic vulcanizates known until now are afflicted with the drawbacks of higher technical processing expenditure and/or connected with high costs, the invention is based on the problem of developing a more favorably priced, soft thermoplastic vulcanizate that exhibits an only minor tendency to discoloration in the course of weathering.

The problem is solved by a thermoplastic vulcanizate comprised of a composition disclosed herein wherein useful material parameters are also specified.

Furthermore, the problem of the invention consists in producing the thermoplastic vulcanizate as defined by the invention without increased expenditure in terms of process technology.

In conjunction, usefull process steps are disclosed.

The thermoplastic vulcanizate and the method for producing it as defined by the invention are now described in the following in greater detail.

According to claim 1, the thermoplastic vulcanizate is comprised of four components (A, B, C, D), notably
- a thermoplastic (A);
- a substantially non-cross-linked polyethylene (B);
- an at least partially vulcanized rubber (C); and
- a plasticizer (D); as well as the standard ingredients (E) of the blend, whereby the individual groups of materials are now introduced in the following in greater detail.

Thermoplastic (A)

It is possible to use any desired thermoplastics such as, for example polystyrene, polyamide, polyester or polypropylene in the form of plastic mixtures, among others. The plastic preferably employed is a polypropylene based on a homopolymer, or on block polymers or copolymers, preferably again in association with high crystallinity.

The component of the thermoplastic amounts to 5 to 20% by weight notably based on the sum of the four components (A, B, C, D).

Non-cross-linked Polyethylene (B)

The substantially non-cross-linked polyethylene is preferably a VLDPE (=very low density polyethylene) with a density of 0.88 to 0.91 g/cm$^3$ at 20° C. and/or a ULDPE (=ultra low density polyethylene) with a density of 0.85 to 0.88 g/cm$^3$ at 20° C.

The component of the non-cross-linked polyethylene amounts to from 5 to 25% by weight and from 5 to 15% by weight, respectively, again based on the sum of the four components (A, B, C, D).

Vulcanized Rubber (C)

Various types of rubber can be employed such as, for example types based on natural rubber (NR), butyl rubber (BR), styrene-butadiene rubber (SBR), nitrile rubber (NBR), or an ethylene-propylene-diene copolymer (EPDM), whereby attention has to be paid to its compatibility with the thermoplastic (A) particularly with respect to the phase inversion.

The rubber employed is preferably an EPDM rubber. The third monomer may be hexadiene-1,4, dicyclopentadiene, or in particular ethylidene-norbonene.

The at least partially vulcanized rubber (C) has a degree of cross-linking of >90%, in particular >95%. A method for the determination of the degree of cross-linking is described in patent U.S. Pat. No. 4,311,268.

The preferred quantitative proportion of the rubber component amounts to from 30 to 50% by weight notably based on the sum of the four components (A, B, C, D).

Plasticizer (D)

Any desired suitable plasticizer can be employed for extending the rubber. In particular paraffinic or naphthalic oils are used for extending the EPDM rubber. The plasticizer oil in the present connection is usefully a paraffinic oil with an aromatic component of <4% by weight notably based on the total mass of the plasticizer. However, particularly a paraffinic plasticizer oil that is free of aromatics is employed.

The quantitative proportion of the plasticizer component amounts to from 25 to 40% by weight or from 25 to 50% by weight, respectively, again based on the sum of the four components (A, B, C, D).

Standard Ingredients of the Blend (E)

An important component is the cross-linking agent or the cross-linking system that additionally contains cross-linking aids (e.g. accelerators). A cross-linking agent or cross-linking system based on a phenolic resin is preferably used, in particular in association with an accelerator consisting of tin dichloride. In this way, a high degree of cross-linking of the rubber (C) is obtained on the one hand, and the polyethylene (B) is prevented from cross-linking on the other.

Furthermore, in most cases, the standard ingredients of the blend comprise a filler as well as additives, whereby the following additives need to be mentioned by way of example: anti-aging agents, UV-absorbers, dye pigments, flame-retarding agents, fluxing agents and/or auxiliary processing agents.

The standard ingredients of the blend are usefully added in from 0.02to 0.5 times the amount by weight, notably based on the sum of the four components (A, B, C, D).

Now, the preferred steps of the method for producing the thermoplastic vulcanizate as defined by the invention are described in the following, notably in the form of two variations (u, v):

Variation (u)

The still-unvulcanized rubber (C) and the standard blend ingredients (E) are first admitted into a continuously operating roll or screw extruder without the cross-linking agent or cross-linking system. The non-cross-linked rubber is present in this connection in a flowable state, preferably in the form of flowable pellets or a granulate.

The unvulcanized rubber (C) as well as the standard blend ingredients (E) are now melted down and dispersed.

The plasticizer (D) is subsequently added and admixed with the two charged components (C, E).

The plasticizer (D) and the standard blend ingredients (E) are preferably added in this process to the unvulcanized rubber (C) within the first third part of the roll or screw extruder.

The mixture comprising the thermoplastic (A) and the non-cross-linked polyethylene (B) is now added, whereby said mixture is particularly added downstream of the first third part of the roll or screw extruder. Meltdown and dispersion of the components (A, B) occur in this step combined with homogenization of the melt.

Thereafter, the cross-linking agent or the cross-linking system is added, whereby the dynamic vulcanization of the rubber (C) takes place at high shearing and expansion rates, which amount to at least 100 s$^{-1}$, in particular 500 to 1500 s$^{-1}$. Furthermore, degassing of the dynamically vulcanized plastic melt, in particular under vacuum, and the subsequent pressure build-up for ejecting the thermoplastic vulcanizate from the mold are associated with the present step of the method. The entire step of the method described above preferably takes place in the second half of the roll or screw extruder.

Finally, the thermoplastic vulcanizate ejected from the mold is usually granulated following cooling.

Variation (v)

According to another variation, the rubber (C) in the still-unvulcanized state is substantially simultaneously mixed with the thermoplastic (A), the non-cross-linked polyethylene (B), the plasticizer (D) and the standard blend ingredients (E) in a roll or screw extruder; however, without the cross-linking agent or cross-linking system. In the present case, too, admixing preferably takes place in the first third part of the roll or screw extruder.

Reference is made to variation (u) with respect to the addition of the cross-linking agent or cross-linking system and the dynamic vulcanization, as well as in regard to the subsequent steps.

The preparation of the mixture of the four components (A, B, C, D) and of all of the standard blend ingredients (E) of the mixture takes place in a single-stage process irrespective of which of the two variations (u, v) is involved.

The thermoplastic vulcanizate and the method as defined by the invention are described in the following by way of example with the help of experimental data.

A Berstorff twin-screw extruder ZE 25 with a length of 54 D and equipped with screws rotating in the same sense was employed as the test production line. The maximally possible number of revolutions of the screws amounts to 500 min$^{-1}$. The EPDM-pellets (A) and the standard blend ingredients (E) of the mixture including the tin dichloride as the accelerator, however, without the cross-linking agent, are metered into the feed opening of the extruder. After the rubber phase is melted down, the plasticizer (D) is injected and admixed in the first third part of the extruder. The mixture comprised of the polypropylene (A) and the polyethylene (B) is added farther downstream. Following meltdown and homogenization of the plastic melt, the phenolic resin is added. Within the framework of a technological processing alternative it is possible also at this point to add in a metered manner a cross-linking system which, in the present case, is comprised of the phenolic resin and the tin dichloride. The dynamic vulcanization of the rubber phase, the degassing of the melt and the pressure build-up for ejecting the vulcanizate from the mold take place in the second half of the extruder. The strand of compound is cooled in a water basin and subsequently granulated.

The granulate is dried for 3 hours at 80° C. and subsequently processed to test specimens on an injection molding machine.

Table 1 shows a summary of a number of mixing formulas by way of example. Furthermore, table 2 represents a few material data of the reference mixtures and the mixtures as defined by the invention. With respect to the measured Shore hardness values it has to be noted that based on past experience, the hardness values determined on an injection-molded test specimens exceed the values measured on extruded flat sections by 3 to 5 points. Mixture I represents the starting basis of the tests. The mixture extended with 100 parts paraffinic plasticizer oil and without VLDPE has a hardness of 70 Shore A. The reference mixtures II and III were adjusted softer by adding additional paraffinic oil. Because of the high oil component of said mixtures it was necessary to produce said mixtures in a two-stage process. The hardness of the reference mixture II extended with 125 parts oil amounts to 65 Shore A, and of the reference mixture III with 150 parts oil comes to 62 Shore A. The mixtures IV and V as defined by the invention were extended with 100 parts oil. In the mixtures IV and V as defined by the invention, VLDPE was substituted for a portion of the polypropylene, as compared to the mixtures I to III. The mixtures IV and V are softer by 10 and, respectively, 13 Shore A versus the mixture I while containing the same proportion of oil. The strength of the mixture V as defined by the invention is comparable to the value of the harder mixture II. In mixture IV, the proportion of the thermoplastic phase was increased from 50 to 60 parts. It was possible in this way to increase the process safety in the production of the thermoplastic vulcanizate without permitting the hardness of the mixture to substantially increase. The hardness of said mixture IV as defined by the invention comes to 10 Shore below the value of the mixture I. The tensile values and the values of deformation under pressure of the mixtures IV and V as defined by the invention are comparable or superior to those obtained with the reference mixtures I to III.

The thermoplastic vulcanizate as defined by the invention exhibits a pleasant haptics similar to rubber. The strength values exceed the level of vulcanizates with equal hardness, excluding thermoplastic vulcanizates extended with oil. By partly substituting non-cross-linked polyethylene (B) for the plasticizer (D) and reducing at the same time the polypropylene component (A), it is possible to produce also soft thermoplastic vulcanizates at favorable cost in a single-stage process, using a roll or screw extruder system. Particularly owing to the use of a non-extended, flowable EPDM, again in particular in connection with a plasticizer oil that is free of aromatics, it is possible to produce soft and bright, weather-resistant thermoplastic vulcanizates.

Furthermore, the tests carried out have shown that the novel type of thermoplastic vulcanizate offers substantial benefits with respect to process safety as well.

The morphological conversion from the phase-phase morphology (non-cross-linked rubber - thermoplastic resin) into the morphology of the particle matrix (vulcanized rubber—thermoplastic resin) is determined in the course of the dynamic vulcanization by the viscosity ratio and the mass ratio of the rubber phase to the thermoplastic phase. Especially in connection with the soft thermoplastic vulcanizates, the morphological conversion during the dynamic vulcanization becomes increasingly more difficult because of the low proportion of the thermoplastic component. By adding polyethylene (B) and reducing at the same time the polypropylene component (A), it is possible to produce a softer thermoplastic vulcanizate while the process safety remains constantly high. As the polyethylene (B) is present in a substantially non-cross-linked state, the thermoplastic vulcanizate as defined by the invention exhibits good flowability.

TABLE 1

| FORMULA | | I pbw | II pbw | III pbw | IV pbw | % | V pbw | % |
|---|---|---|---|---|---|---|---|---|
| A | Polypropylene | 50 | 50 | 50 | 35 | 13.46 | 30 | 12 |
| B | VLDPE | — | — | — | 25 | 9.62 | 20 | 8 |
| C | EPDM rubber | 100 | 100 | 100 | 100 | 38.46 | 100 | 40 |
| D | Plasticizer | 100 | 125 | 150 | 100 | 38.46 | 100 | 40 |
| E | Fillers and additives | 36 | 36 | 36 | 36 | | 36 | |
| | Tin chloride | 1 | 1 | 1 | 1 | | 1 | |
| | Phenolic resin | 6 | 6 | 6 | 6 | | 6 | |
| Sum | | 293 | 318 | 343 | 303 | | 293 | |

Pbw = parts by weight
% = percent by weight

Raw materials used:
EPDM rubbers : Royalene IM 7100/Buna EPG 6470C
Polypropylene: Eltex P HF 100/Moplen Q 30 P
VLDPE : Clearflex MQFO /Clearflex MPDO
Plasticizer : Tudalen 9246/Enerpar M 1930
Filler : Barytmehl N 903/Polestar 200 R
Additives : Irganox 1010/Irganox 1135/Tinuvin 770/ Chemasorb 944
Phenolic resin: SP 1045

TABLE 2

Characteristics of mixtures I to V

| Formula No. | I | II | III | IV | V |
|---|---|---|---|---|---|
| Hardness Shore A [Skt] | 70 | 65 | 62 | 60 | 57 |
| Tear resistance [N/mm$^2$] | 4.3 | 3.3 | 2.8 | 3.4 | 3.2 |
| Elongation at rupture [%] | 233 | 229 | 209 | 180 | 196 |
| DVR (25%/22 h/RT) [%] | 21 | 22 | 21 | 19 | 16 |
| DVR (25%/22 h/70°) [%] | 33 | 34 | 35 | 37 | 31 |
| DVR (25%/22 h/100° C.) [%] | 44 | 41 | 44 | 40 | 33 |
| ZVR (25%/22 h/RT) [%] | — | 23 | 22 | 22 | 18 |

What is claimed is:

1. A thermoplastic vulcanizate of four components A,B, C,D), comprising a thermoplastic synthetic resin (A);

a substantially cross-linked polyethylene (B);

a rubber (C) having a degree of cross-linking of>90% and a plasticizer (D);

as well as of standard blend ingredients (E) comprising at least one cross-linking agent or cross-linking system, whereby a mixture is comprised of the following quantitative proportions (in % by weight) based on the sum of the four components (A,B,C,D);

thermoplastic synthetic resin (A) 5 to 20
polyethylene (B) 25 to 5
rubber (C) 30 to 50
plasticizer (D) 50 to 25
wherein the thermoplastic synthetic resin (A) is a propylene based on a homopolymer, block polymer or copolymer in conjunction with high crystallinity.

2. The thermoplastic vulcanizate according to claim 1, wherein the standard ingredients (E) of the blend are added in from 0.02 to 0.5 times the amount by weight based on the sum of the four components (A, B, C, D).

3. The thermoplastic vulcanizate according to claim 1, wherein the polyethylene (B) is a VLDPE with a density of from 0.88 to 0.91 g/cm$^3$ at 20° C. or a ULDPE with a density of from 0.85 to 0.88 g/cm$^3$ at 20° C.

4. The thermoplastic vulcanizate according to claim 1 wherein the rubber (C) is an EPDM rubber, whereby the third monomer is an ethylidene-norbonene.

5. The thermoplastic vulcanizate according to claim 1, wherein the rubber (C) has a degree of cross-linking of >90%.

6. The thermoplastic vulcanizate according to claim 1, wherein the plasticizer (D) is a plasticizer oil, or a panic oil with a component of aromatics of <4% by weight or a paraffinic plasticizer oil free of aromatics.

7. A method for producing a thermoplastic vulcanizate of four components (A,B,C,D), comprising
a thermoplastic synthetic resin (A);
a substantially non-cross-linked polyethylene (B);
a rubber (C) having a degree of cross-linking of >90% and
a plasticizer (D);
as well as of standard blend ingredients (E) comprising at least one cross-linking agent or cross-linking system, whereby a mixture is comprised of the following quantitative proportions (in % by weight) based on the sum of the four components (A,B,C,D):
thermoplastic synthetic resin (A) 5 to 20
polyethylene (B) 25 to 5
rubber (C) 30 to 50
plasticizer (D) 50 to 25
wherein the rubber (C) is in the still-unvulcanized state is first mixed with a plasticizer (D) and the standard blend ingredients (E) in a roll or screw extruder, whereby the standard blend ingredients still do not yet contain a cross-linking agent or cross-linking system.

8. The method for producing a thermoplastic vulcanizate according to claim 7, comprising the following process steps:
feeding of the unvulcanized rubber (C) and the standard blend ingredients (E);
meltdown and dispersion of the rubber (C) as welt as of the standard blend ingredients (E); and
addition of the plasticizer (D) while mixing with the two charged components (C), (E).

9. The method for producing a thermoplastic vulcanizate according to claim 7,
wherein the plasticizer (D) and the standard blend ingredients (E) are admixed into the unvulcanized rubber (C) in the first third part of the roll or screw extruder.

10. The method for producing a thermoplastic vulcanizate according to claim 7,
wherein a mixture comprised of the thermoplastic synthetic resin (A), and the non-cross-linked polyethylene (B) is added downstream of the first third of the roll or screw extruder.

11. A method for producing a thermoplastic vulcanizate according to claim 1, comprising the step of
substantially simultaneously mixing in a roll or screw extruder, the rubber (C) in the still-unvulcanized state with the thermoplastic synthetic resin (A), the non-cross-linked polyethylene (B), the plasticizer (D) and the standard blend ingredients (E), whereby the standard blend ingredients do not yet contain a cross-linking agent or cross-linking system.

12. The method for producing a thermoplastic vulcanizate according to claim 11,
wherein the thermoplastic synthetic resin (A), the non-cross-linked polyethylene (B), the plasticizer (D) and the standard blend ingredients (E) are admixed into the unvulcanized rubber (C) in the first third part of the roll or screw extruder.

13. The method for producing a thermoplastic vulcanizate according to claim 7,
wherein a non-cross-linked rubber (C) is used, said rubber being present in a flowable state in the form of a flowable pellet or granulate.

14. The method for producing a thermoplastic vulcanizate according to claim 7,
wherein following mixing of the four components (A, B, C, D) and the standard blend ingredients (E) without the cross-linking agent or cross-linking system, the cross-linking agent or the cross-linking system is now added in conjunction with the following steps of the process:
dynamic vulcanization of the rubber (C) at high shear and expansion rates;
degassing of the dynamically vulcanized plastic melt, under vacuum; and
building up the pressure for ejecting the thermoplastic vulcanizate from the mold.

15. The method for producing a thermoplastic vulcanizate according to claim 7,
wherein all steps of the method in connection with the addition of the cross-linking agent or cross-linking system are carried out in the second half of the roll or screw extruder.

16. The method for producing a thermoplastic vulcanizate according to claim 7,
wherein a cross-linking agent or cross-linking system is used that cross-links the rubber (C), and prevents the polyethylene (B) from cross-linking based on a phenolic resin, in connection with an accelerator consisting of tin dichloride.

17. The method for producing a thermoplastic vulcanizate according to claim 7,
wherein the preparation of the mixture comprised of the four components (A, B, C, D) and all of the standard blend ingredients is carried out in a single-stage process.

* * * * *

UNITED STATES PATENT AND TRADEMARK OFFICE
CERTIFICATE OF CORRECTION

PATENT NO. : 6,774,162 B1 Page 1 of 1
DATED : August 10, 2004
INVENTOR(S) : Jong Vortkort et al.

It is certified that error appears in the above-identified patent and that said Letters Patent is hereby corrected as shown below:

<u>Column 6,</u>
Line 59, "cross-linked" should read -- non-cross-linked --.

<u>Column 7,</u>
Line 23, "panic" should read -- paraffinic --.

Signed and Sealed this

Fourth Day of April, 2006

JON W. DUDAS
*Director of the United States Patent and Trademark Office*